July 12, 1960
T. R. LANE
2,944,762
AIRCRAFT
Filed Dec. 12, 1955
2 Sheets-Sheet 2
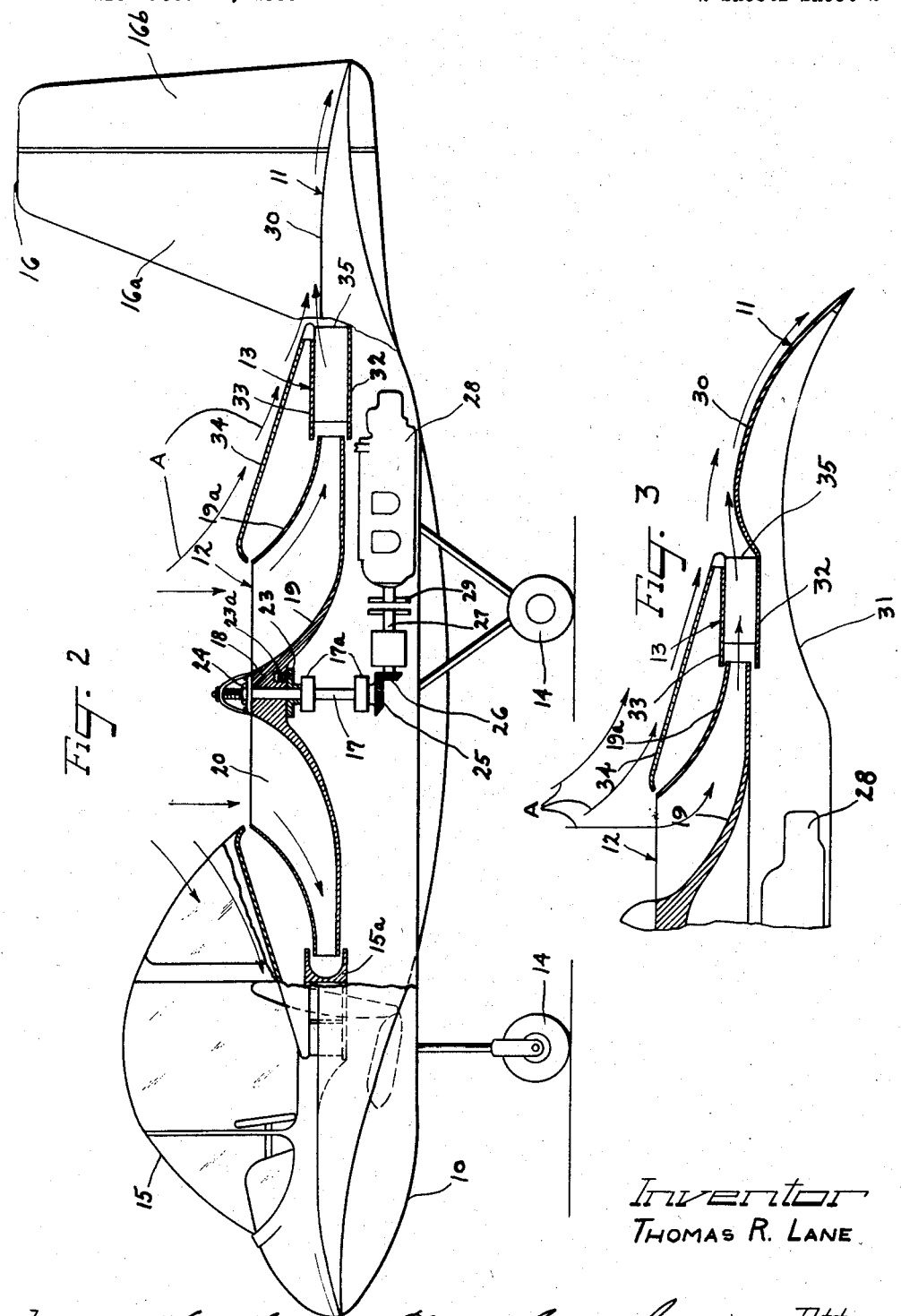
Inventor
THOMAS R. LANE

United States Patent Office 2,944,762
Patented July 12, 1960

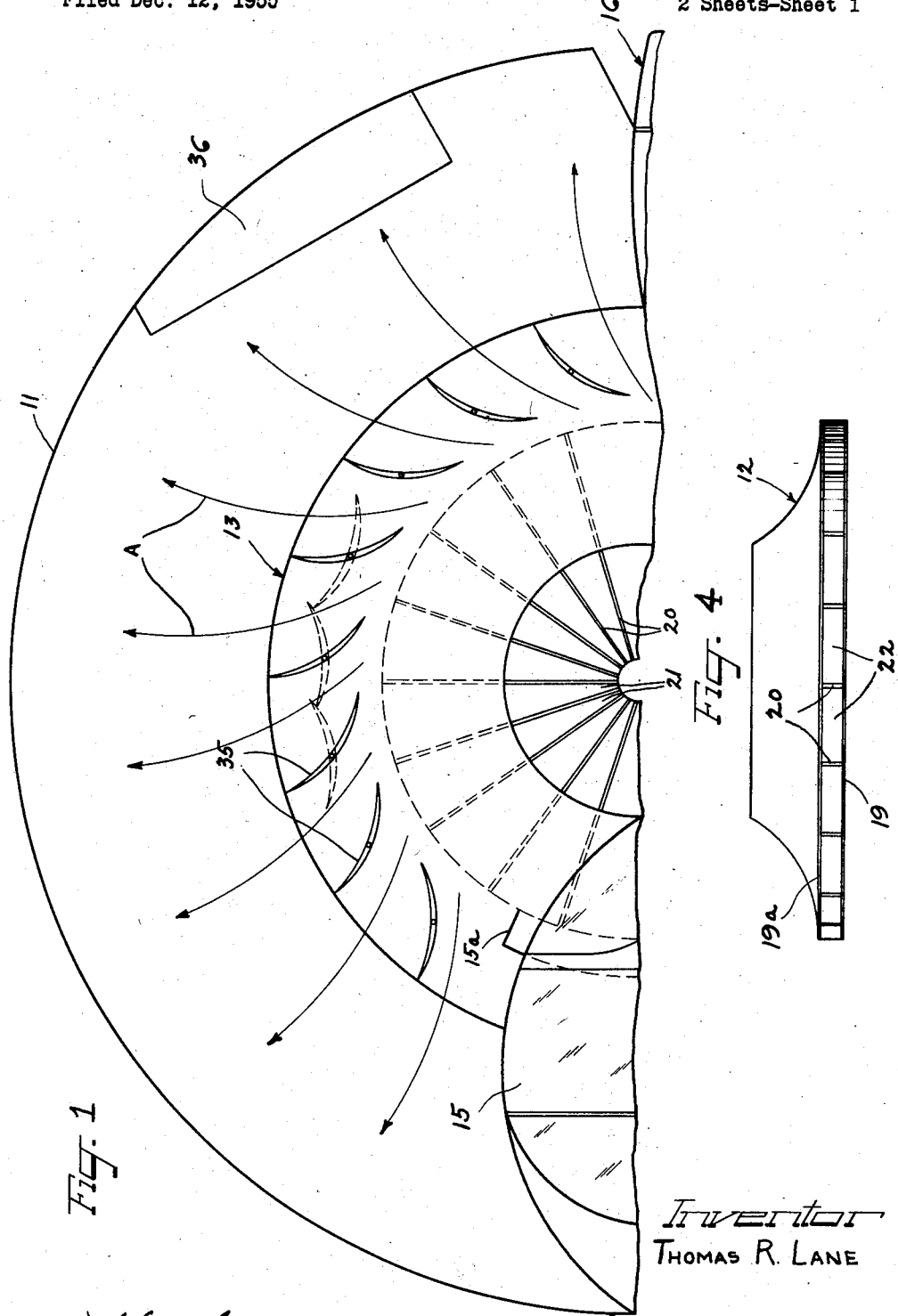

2,944,762

AIRCRAFT

Thomas R. Lane, Cleveland, Ohio, assignor to Thompson Ramo Wooldridge Inc., a corporation of Ohio Filed Dec. 12, 1955, Ser. No. 552,378

4 Claims. (Cl. 244—12)

This invention relates in general to an aircraft, and more particularly to an aircraft capable of ascending vertically or flying in any direction once airborne. Specifically, this invention deals with an aircraft which utilizes a jet propulsion system in conjunction with an airfoil or wing surface so as to produce lift and forward motion by the controlled coaction of these elements.

With the advent of the jet propulsion principle to aircraft, particularly for military and commercial use, there has been a continuing search to effectively apply this method of propulsion to the small private airplane. While the jet propulsion system, in a few cases, has been applied to small private aircraft, in these instances the application has not proved entirely satisfactory. This is mainly due to the insufficient degree of maneuverability and inefficiency in operation.

According to the invention, a substantially circular wing or airfoil and a power driven slow-speed, large mass flow compressor carries a cabin. A stator assembly selectively delivers the fluid flow from the compressor over the upper surface of the wing or airfoil enabling the aircraft to ascend vertically, hover, or fly in any direction.

Accordingly, it is an object of this invention to provide an aircraft which has an extremely high degree of maneuverability in that it is capable of ascending vertically, hovering, or flying in any direction.

It is also an object of this invention to provide an aircraft that may be operated from small landing and takeoff facilities, is simple and economical to operate, and is relatively cheap to manufacture.

Another object of this invention is to provide additional lift due to induction of additional air over the top of the aircraft by the airstream moving vertically into the compressor.

Another object of this invention resides in the provision of an aircraft of the conventional light plane class which employs the principle of jet propulsion without sacrificing any maneuverability.

A further object of this invention is in the provision of an aircraft that employs a jet propulsion system in conjunction with an airfoil or wing surface so as to produce lift and forward motion by the controlled coaction of these elements.

A still further object of this invention is to provide an aircraft that employs a large mass flow, light weight, slow-speed compressor assembly for power which will permit hovering flight as well as flight in any direction with vertical ascent, and which further serves as a stabilizing influence to the aircraft due to the gyroscopic action of the rotating compressor.

A further feature of the present invention is to provide an aircraft equipped with a generally circular wing that permits a substantially lighter construction due to the inherent strength of the circular structure.

A still further feature of the present invention resides in the provision of an aircraft that is capable of gliding safely to a landing in the event of a power failure.

A still further object of this invention is in the provision of an aircraft equipped with a large, relatively slow-speed rotary compressor that effects a combined source of forward motion and lift when used in conjunctive interaction with a wing or airfoil surface.

A further feature of this invention resides in the provision of having a rotary compressor for power and a stator assembly for controlling the compressor fluid flow which in effect controls the operation of aircraft.

A still further object of the present invention is to provide an aircraft equipped with a system of movable control surfaces in addition to the stator assembly to compensate for small flight displacements and guide the aircraft in case of a power failure.

Other objects, features and advantages of the invention will be apparent from the following detailed disclosures, taken in conjunction with the accompanying sheets of drawings, wherein like reference numerals refer to like parts, in which:

Figure 1 is a more or less diagrammatic fragmentary plan view of the present invention, with parts removed for showing underlying parts and illustrating the relative positions of the compressor rotor, the stator assembly, and the wing;

Figure 2 is a more or less diagrammatic side elevational view of the invention with parts broken away to show underlying parts, some of which are in section;

Figure 3 is a more or less diagrammatic fragmentary transverse sectional view of the invention, with some parts in elevation; and Figure 4 is an end elevational view of the compressor rotor removed from the aircraft.

As shown on the drawings:

Referring particularly to Figs. 1 and 2, an aircraft according to the instant invention includes generally a fuselage 10 having a substantially circular or ring-shaped wing or airfoil 11, a compressor rotor or fan 12, and a stator assembly 13 for controlling the compressor fluid discharge.

The cabin 10 is generally elongated and carries along its under side any appropriate landing apparatus such as the landing wheels 14 in the instant case. A bubble-type canopy 15 is provided near the forward end of the fuselage for housing the pilot's compartment and aircraft controls, while a vertical stabilizer assembly 16 is carried at the rear end of the fuselage.

The cabin 10 extends partially diametrically across the circular wing or airfoil 11. Concentrically mounted with respect to the circular wing at the center thereof is a compressor rotor shaft 17. The shaft 17 is vertically mounted and carried by a pair of bearings 17a, 17a that are held by the fuselage.

The compressor rotor 12 may be of any conventional type and includes a hub portion 18, a radially downwardly and outwardly flared bottom plate 19, and a plurality of radially extending and substantially vertically positioned vanes or blades 20. An upper plate 19a contoured similarly to the lower plate or bottom plate 19 abuts the upstanding edge of the blade opposite the edge connected to the bottom plate 19 to coact therewith and provide a plurality of intake openings 21 (Figure 1) and a plurality of discharge openings 22 (see Fig. 4). Thus, the air is taken in by the compressor rotor 12 vertically and discharges radially.

To mount the rotor 12 on the shaft 17, a collar 23 is fixedly secured to the shaft 17 to bottom the underside of the rotor hub 18. A pin 23a is carried by the collar 23 to be received in a suitable aperture of the rotor hub 18 to drivingly connect the shaft 17 to the rotor 12. A nut assembly 24 is received on the upper threaded end of the shaft 17 to hold the rotor 12 in place and against the collar 23.

To drive the rotor 12, a bevel gear 25 may be carried on the lower end of the shaft 17 which meshes with a smaller beveled gear 26 on a bearing mounted shaft 27. A prime mover 28, such as a conventional internal combustion engine, or gas turbine is connected to the shaft 27 by any suitable arrangement 29. It is noted that the difference in sizes of the bevel gears 25 and 25 will effect a gear reduction arrangement.

The wing or airfoil 11 is provided with an upper convex surface 30 and a lower concave surface 31. The high velocity fluid discharged from the compressor rotor 12 is directed to the upper surface 30 by a lower annular plate member 32 which underlies the peripheral edge of the rotor 12 and connects to the inner peripheral edge of the wing 11. In the area of the canopy 15, an arcuate deflector 15a directs the airflow from the compressor to the opposite sides thereof. An upper annular plate 33 is vertically spaced but aligned with the lower plate 32 and slightly overlies the upper peripheral edge of the rotor 12 and extends radially outwardly to a point substantially above the connection of the lower plate 32 to the wing 11. To provide an enclosure for the upper plate 33 and a portion of the compressor rotor 12 and to further define the intake to the compressor, a conically shaped annulus 34 extends from the outer periphery of the upper plate 33 to the upper periphery of the rotor plate 19a.

To selectively control the compressor discharge flow in conjunction with the upper airfoil surface 30 and to provide directional control for the aircraft, the stator assembly 13 extends between the discharge openings 22 of the compressor and the upper surface of the airfoil 11. Actually, an annular chamber is defined between the lower and upper plates 32 and 33 in which the stator assembly is carried. The stator assembly 13 comprises a plurality of equally spaced stator vanes or blades 35 that are pivotally mounted about their center vertical axis to be individually or collectively adjusted according to the desirable flight movement. The vanes 35, in the instant invention, are somewhat arcuate in shape as seen in Fig. 1 and provided with sharp leading and trailing edges. Of course, other types of stator blades may be employed. As shown by dotted lines in Fig. 1, with respect to three of the stator blades, upon closing of the blades the respective leading and trailing edges of adjacent blades overlap to completely close off the compressor fluid discharge in any direction whenever desired.

Also, high lift devices such as flaps, etc. may be used. Such devices would usually be placed at the stator discharge and over the upper surface of the airfoil.

While the relatively slow-speed, large mass flow compressor rotor 12 primarily serves to provide a high velocity air flow over the upper airfoil surface 30, it further serves to provide a gyroscopic action for the aircraft which tends to act as a stabilizer against pitch, roll or yaw. The stator blades 35 also function to straighten the air flow from the compressor and to cancel or counteract the compressor rotor torque.

In operation, the compressor rotor 12 takes air vertically from the atmosphere, adds energy to the air by increasing its velocity, and expels the air horizontally through the stator vanes 35. The vanes 35 principally provide a means of controlling the air quantity direction and pressure, and from the stator vanes, the air flow is directed approximately radially over the upper surface 30 of the ring-shaped wing 11, thereby creating a lift force. When the air is directed over the entire upper wing surface, the lift force will be substantially equally distributed along the wing area to allow the aircraft to ascend vertically and hover if desired. In such a case, the airflow pattern will simulate that illustrated by the arrows A on Figs. 1, 2 and 3. Propulsion in any horizontal dirction, including forward flight, may then be obtained by varying the angular setting of the groups of stator vanes 35, which in effect changes the air flow over the portions of the upper airfoil surface 30.

The induction of adidtional air by the air moving vertically into the compressor inlet provides additional lift. This air flows over the surface 34 before flowing over the upper airfoil surface, and generates most of its lift on the surface 34.

When forward flight is desired, and after a suitable altitude has been reached, the lateral stator vanes may be gradually rotated to their closed positions such as shown by dotted lines in Fig. 1, whereupon the greater portion of the compressor discharge air flow will be diverted through the vanes at the rear of the plane thereby imparting forward motion. As forward speed continues to increase progressively more of the lateral vanes may be closed so that the full rotor flow is utilized for forward thrust. During forward motion of the aircraft, the interaction of the cambered upper and lower airfoil surfaces, 30 and 31, respectively, creates lift as in a conventional aircraft to sustain the aircraft in leveled forward flight without the additional velocity boost of the compressor air along the lateral portions of the wing. The lower concave airfoil surface 31 also provides a stabilizing action against rolling, pitching, or yawing, while the plane is in flight.

To provide additional controlling means for correcting small flight displacements, and in the event of a power failure, a pair of elevons 36 (Figure 1) is carried along the periphery of the air foil 11 and adjacent the rear end of the airfoil in arcuately spaced relationship on opposite sides of the stabilizer assembly 16. The vertical stabilizer assembly 16 also provides additional flight controls and comprises a vertical stabilizer fin 16a and a rudder 16b. The assembly 16 serves as an additional stabilizer against rotation of the aircraft and provides a device for steering when desired.

In the event of a power failure under forward motion, the pilot can glide safely to earth and control such a glided flight by the elevons 36 and the rudder 16b. In hovering flight, the aircraft will fall after a power failure, as will any stalled aircraft, until the airfoil 11 unstalls and the craft becomes a glider.

Another control means, wherein the exit area between adjacent stator blades and the lower and upper annular plates 32 and 33 may be varied, is provided by the upper plate 33 which may be elevated or lowered thereby causing a corresponding decrease or increase, respectively, of the air flow velocity from the compressor over the upper cambered airfoil surface 30 of the airfoil 11.

It will be understood that modification and variations may be effected without departing from the scope of the novel concepts of the present invention, but it is understood that this application is to be limited only by the scope of the appended claims.

I claim as my invention:

1. An aircraft of generally circular configuration in plan and constructed for vertical, horizontal and hovering flight, comprising a saucer-shaped fuselage having a cabin spaced between the periphery and center thereof and a rigid ring-shaped cambered airfoil providing the peripheral portion of said fuselage and interrupted by said cabin, a compressor substantially enclosed by the fuselage at generally the center thereof and comprising a pair of flared and vertically spaced plates and a plurality of generally vertical and radially extending vanes between said plates, the upper ends of said plates providing a plurality of circumferentially spaced air intake openings and the lower ends a plurality of circumferentially spaced air discharge openings whereby the path of air flow is first vertically and then radially, a stator assembly essentially entirely surrounding the compressor and also enclosed by the fuselage, said stator assembly comprising a pair of vertically spaced plates mounted closely adjacent the lower ends of the compressor plates to receive air from the compressor discharge openings and direct said air over the upper surface only of the airfoil, said stator assembly further including a plurality of arcuately swept vanes mounted for horizontally swingable movement by the stator plates and being of a length such that when a pair of said vanes are pivoted to a sufficient degree the ends thereof overlap and the compressed air flow over a particular portion of the airfoil is closed off, and means for rotating the compressor to take air from the atmosphere into the intake openings and between the compressor plates first in a generally vertical direction and then radially in compressed condition through the discharge openings and through the stator assembly over the upper surface of the airfoil to cause the aircraft to ascend and hover, whereupon when horizontal flight is desired the stator vanes are adjusted to direct the air over only particular portions of the upper surface of the airfoil.

2. An aircraft of generally circular configuration in plan and constructed for vertical, horizontal and hovering flight, comprising a saucer-shaped fuselage having a cabin spaced between the periphery and center thereof and a rigid ring-shaped cambered airfoil providing the peripheral portion of said fuselage and interrupted by said cabin, a compressor substantially enclosed by the fuselage at generally the center thereof and comprising a pair of flared and vertically spaced plates and a plurality of generally vertical and radially extending vanes between said plates, the upper ends of said plates providing a plurality of circumferentially spaced air intake openings and the lower ends a plurality of circumferentially spaced air discharge openings whereby the path of air flow is first vertically and then radially, a stator assembly essentially entirely surrounding the compressor and also enclosed by the fuselage, said stator assembly comprising a pair of vertically spaced plates mounted closely adjacent the lower ends of the compressor plates to receive air from the compressor discharge openings and direct said air over the upper surface only of the airfoil, said stator assembly further including a plurality of arcuately swept vanes mounted for horizontally swingable movement by the stator plates and being of a length such that when a pair of said vanes are pivoted to a sufficient degree the ends thereof overlap and the compressed air flow over a particular portion of the airfoil is closed off, a generally conically shaped annulus extending from the periphery of the upper stator plate to the periphery of the upper compressor plate to provide an enclosure for said stator plate and to further define the air intake to the compressor, and means for rotating the compressor to take air from the atmosphere into the intake openings and between the compressor plates first in a generally vertical direction and then radially in compressed condition through the discharge openings and through the stator assembly over the upper surface of the airfoil to cause the aircraft to ascend and hover, whereupon when horizontal flight is desired the stator vanes are adjusted to direct the air over only particular positions of the upper surface of the airfoil, the air flow path during vertical ascent being further along the upper surface of the annulus and then along the upper surface of the airfoil surface.

3. An aircraft of generally circular configuration in plan and constructed for vertical, horizontal and hovering flight, comprising a saucer-shaped fuselage having a cabin spaced between the periphery and center thereof and a rigid ring-shaped cambered airfoil providing the peripheral portion of said fuselage and interrupted by said cabin, a compressor substantially enclosed by the fuselage at generally the center thereof and comprising a pair of flared and vertically spaced plates and a plurality of generally vertical and radially extending vanes between said plates, the upper ends of said plates providing a plurality of circumferentially spaced air intake openings and the lower ends a plurality of circumferentially spaced air discharge openings whereby the path of air flow is first vertically and then radially, a stator assembly essentially entirely surrounding the compressor and also enclosed by the fuselage, said stator assembly comprising a pair of vertically spaced plates mounted closely adjacent the lower ends of the compressor plates to receive air from the compressor discharge openings and direct said air over the upper surface only of the airfoil, said stator assembly further including a plurality of arcuately swept vanes mounted for horizontally swingable movement by the stator plates and being of a length such that when a pair of said vanes are pivoted to a sufficient degree the ends thereof overlap and the compressed air flow over a particular portion of the airfoil is closed off, an arcuate deflector closely adjacent the canopy to direct the airflow from the compressor discharge openings along opposite sides of said canopy, and means for rotating the compressor to take air from the atmosphere into the intake openings and between the compressor plates first in a generally vertical direction and then radially in compressed condition through the discharge openings and through the stator assembly over the upper surface of the airfoil to cause the aircraft to ascend and hover, whereupon when horizontal flight is desired the stator vanes are adjusted to direct the air over only particular portions of the upper surface of the airfoil, the air flow path being further along opposite sides of the canopy by action of the arcuate deflector.

4. An aircraft of generally circular configuration in plan and constructed for vertical, horizontal and hovering flight, comprising a saucer-shaped fuselage having a cabin spaced between the periphery and center thereof and a rigid ring-shaped cambered airfoil providing the peripheral portion of said fuselage and interrupted by said cabin, a compressor substantially enclosed by the fuselage at generally the center thereof and comprising a pair of flared and vertically spaced plates and a plurality of generally vertical and radially extending vanes between said plates, the upper ends of said plates providing a plurality of circumferentially spaced air intake openings and the lower ends a plurality of circumferentially spaced air discharge openings whereby the path of air flow is first vertically and then radially, a stator assembly essentially entirely surrounding the compressor and also enclosed by the fuselage, said stator assembly comprising a pair of vertically spaced plates mounted closely adjacent the lower ends of the compressor plates to receive air from the compressor discharge openings and direct said air over the upper surface only of the airfoil, said stator assembly further including a plurality of arcuately swept vanes mounted for horizontally swingable movement by the stator plates and being of a length such that when a pair of said vanes are pivoted to a sufficient degrees the ends thereof overlap and the compressed air flow over a particular portion of the airfoil is closed off, a pair of elevons mounted on the periphery of the airfoil and at the opposite end of the fuselage from the canopy to correct for small flight displacements and to control the aircraft in a glide.

References Cited in the file of this patent

UNITED STATES PATENTS

| | | |
|---|---|---|
| 1,846,125 | La Fon | Feb. 23, 1932 |
| 1,911,041 | Smyer | May 23, 1933 |
| 2,547,266 | Hoglin | Apr. 3, 1951 |
| 2,718,364 | Crabtree | Sept. 20, 1955 |
| 2,726,829 | Hillis | Dec. 13, 1955 |
| 2,801,058 | Lent | July 30, 1957 |
| 2,807,428 | Wilbault | Sept. 24, 1957 |

FOREIGN PATENTS

| | | |
|---|---|---|
| 406,971 | Great Britain | June 1, 1932 |
| 758,732 | Australia | May 31, 1932 |